United States Patent

Sakaegi

[11] Patent Number: 5,808,678
[45] Date of Patent: Sep. 15, 1998

[54] METHOD AND APPARATUS FOR DESIGNING A POSITION ON A VIEW FINDER BASED ON MOTION DETECTION

[75] Inventor: Yuji Sakaegi, Yokohama, Japan

[73] Assignee: Canon Kabushiki Kaisha, Tokyo, Japan

[21] Appl. No.: 749,079

[22] Filed: Nov. 14, 1996

Related U.S. Application Data

[63] Continuation of Ser. No. 336,008, Nov. 8, 1994, abandoned.

[30] Foreign Application Priority Data

Nov. 10, 1993 [JP] Japan .................................. 5-281010

[51] Int. Cl.$^6$ .................................................. H04N 5/232
[52] U.S. Cl. ................................................ 348/334; 348/350
[58] Field of Search ................................ 348/350, 335, 348/334, 333, 240, 169, 15

[56] References Cited

U.S. PATENT DOCUMENTS

| | | | |
|---|---|---|---|
| 4,109,145 | 8/1978 | Graf | 250/201 |
| 4,991,020 | 2/1991 | Zwirn | 348/240 |
| 5,051,833 | 9/1991 | Tsuji | 348/334 X |
| 5,128,768 | 7/1992 | Suda et al. | 348/350 |
| 5,196,929 | 3/1993 | Miyasaka | 348/169 |
| 5,204,749 | 4/1993 | Toyama et al. | 348/350 |
| 5,223,934 | 6/1993 | Hong | 348/333 X |

FOREIGN PATENT DOCUMENTS 05167906  7/1993  Japan ............................. H04N 5/232

*Primary Examiner*—Wendy Garber
*Attorney, Agent, or Firm*—Morgan & Finnegan LLP

[57] ABSTRACT

A small-sized and cost-saving position designating apparatus without specific operation device. As an area designation SW 21 is pressed, a cursor mark 203 is displayed in the finder image on an electronic view finder 19. A motion detecting unit 6 detects the motion of an object in the finder image by moving the camera while pressing the area designation SW 21. The cursor 203 moves with the image based on the detected motion information, and a circle 202 is displayed. As the area designation SW 21 is released and the angle of the camera is returned to the initial angle, the area surrounded by the circle 202 or point is designated. Within this point or area, light, color and focal length are measured.

9 Claims, 13 Drawing Sheets

AREA DESTINATION ACCORDING TO FIRST EMBODIMENT

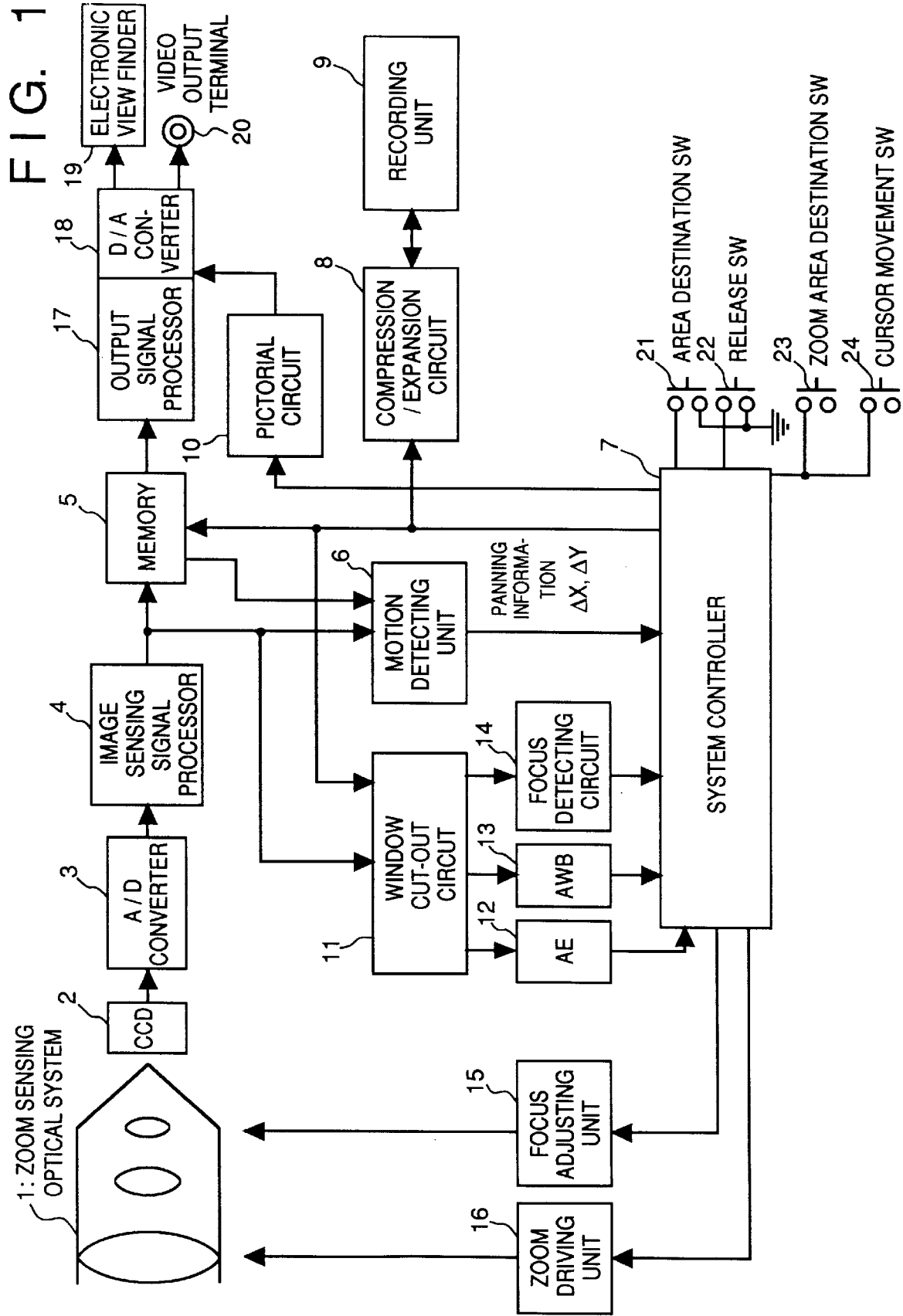

AREA DESTINATION ACCORDING TO FIRST EMBODIMENT

MOTION DETECTING PRINCIPLE
FIG. 3A  DIVIDING DISPLAY IMAGE INTO BLOCKS
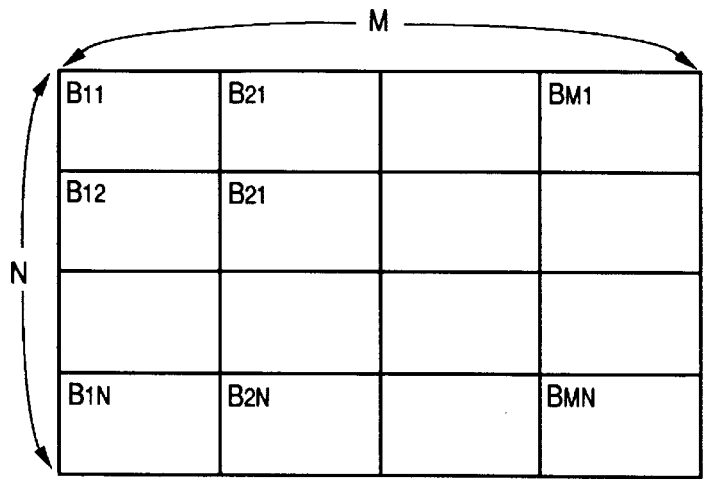
FIG. 3B  PIXEL POSITIONS ONE BLOCK
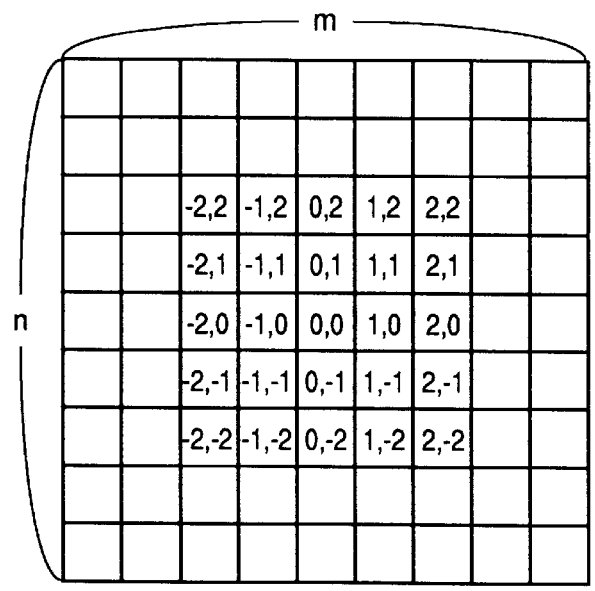
FIG. 3C  HISTOGRAM OF MOTION VECTORS
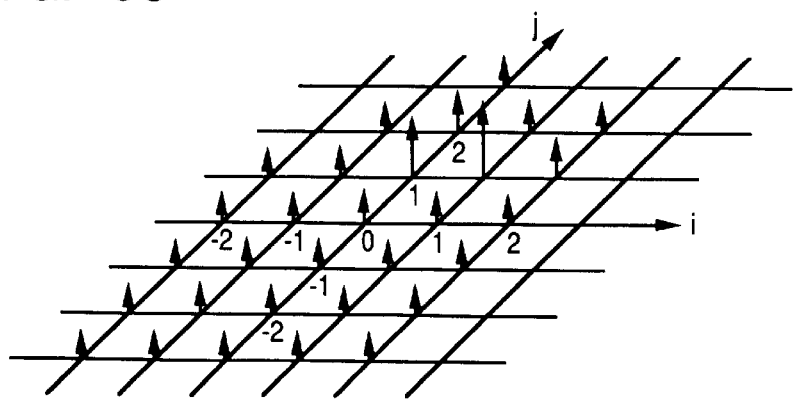

OPERATION OF FIRST EMBODIMENT

SECOND ENBODIMENT

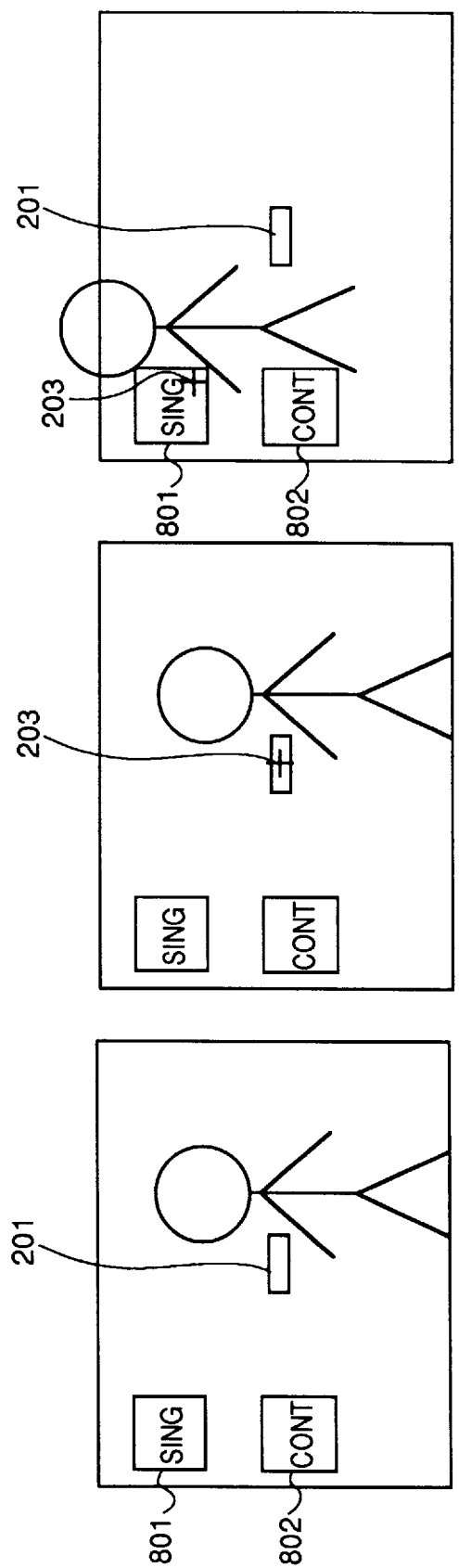

OPERATION OF THIRD EMBODIMENT

METHOD AND APPARATUS FOR DESIGNING A POSITION ON A VIEW FINDER BASED ON MOTION DETECTION

This is a continuation of application Ser. No. 08/336,008, filed on Nov. 8, 1994 now abandoned.

BACKGROUND OF THE INVENTION

The present invention relates to a position designating method and apparatus, in a device having an image sensing unit and a display unit, for designating a position on a displayed view finder image, and a camera having it.

An image recording apparatus where an exposure point or focus point can be moved to an arbitrary position within a view finder screen is needed. For example, in FIG. 10, reference numeral 101 denotes a finder; and 102, a marker put at the center of the finder screen. Many cameras have a focus point and an exposure point at the marker 102 position. However, as shown in FIG. 10, when two persons are taken by the above type of camera, the marker 102 is behind the people and the background is focused and exposed. Thus the image is not focused. In this simple example, to solve the problem, the camera may detect the existence of the object by using a plurality of photosensors and focal length sensors. However, this solution does not always achieve image pickup to meet a user's intention and has limitation.

To ensure image sensing desirable to the user, means for designating arbitrary position within the finder 101 is indispensable. Followings are conventional arts for position designation.

FIG. 11 shows the construction of the first conventional camera.

The apparatus comprises cursor display means 111 within an electronic view finder 112; a switch 113 for moving the cursor in a horizontal direction (X direction) and a switch 114 for moving the cursor in a vertical direction (Y direction). In accordance with the operation of the switches 113 and 114, the cursor is placed within the electronic view finder 112 screen and is moved so as to designate a position within the electronic view finder 112 of as the position.

FIG. 12 shows the construction of the second conventional camera. Note that in this example, the switches 113 and 114 in the first conventional art in FIG. 11 in the first Embodiment are replaced with a track ball 121.

FIG. 13 shows the construction of a third conventional camera. In this example, a view detecting means 131 is provided by the side of the finder 112 so as to designate the position within the finder 112 screen.

However, the first conventional art has at least two operation switches for designating the cursor coordinates in the X and Y directions, further, it has four or eight operation switches for improving operability. This is disadvantageous in view of designing and manufacturing costs. Further, operating this apparatus is complicated.

In the second conventional art, the X and Y cursor coordinates can be easily made. However, it is hard and troublesome for a user to manipulate the track ball while holding the camera. The track ball cannot be produced in a small size. Moreover, the mechanical construction is so complicated that production costs cannot be reduced.

In the third conventional art, the apparatus needs an image sensing system such as a CCD sensor and moving image processing unit at the finder for viewpoint detection.

SUMMARY OF THE INVENTION

The present invention has been made in view of the above problems, and has as its object to provide a cost-saving small position designation method and apparatus for designating a point in a displayed finder image.

Another object of the invention is to provide a camera having the above characteristic apparatus.

According to the present invention, the above object is attained by providing a position designating apparatus which obtains motion of an image based on information from image sensing means, and controls the position in the displayed image.

Specifically, a position designating apparatus according to the present invention comprises: image sensing means; display means for displaying an image frame sensed by said image sensing means; motion detection means for detecting motion of an image in the image frame displayed by said display means based on output from said image sensing means; mark generation means for generating a mark indicative of a predetermined area or point within the image frame displayed by said display means; and marker position control means for controlling a position of the marker generated by marker generation means based on the output from said image sensing means, wherein a point in the image frame is designated by the marker.

According to the present invention, the position of the marker indicating a predetermined area or point in the image displayed on the display means is controlled based on the motion of image outputted from the image sensing means.

As described above, an area or point in a finder image can be designated without using any specific operation device, thus excellent operation environment can be provided to the user.

Recently, a vibration-proof system on image sensing devices such as a small-sized video camera, includes a motion detecting device and blur correction based on the detected motion information, is available. The motion detecting unit of the present invention may be used in such vibration-proof system. If a camera has this vibration-proof system, the present invention can be applied to the camera without increasing manufacturing costs.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the construction of a embodiment of the present invention;

FIGS. 3A to 3C are explanatory views of motion detection principle;

FIGS. 8A to 8C are explanatory views of icon designation according to a third embodiment of the present invention;

DETAILED DESCRIPTION OF THE PREFERRED EMBODIMENT(S)

Figure 2A:
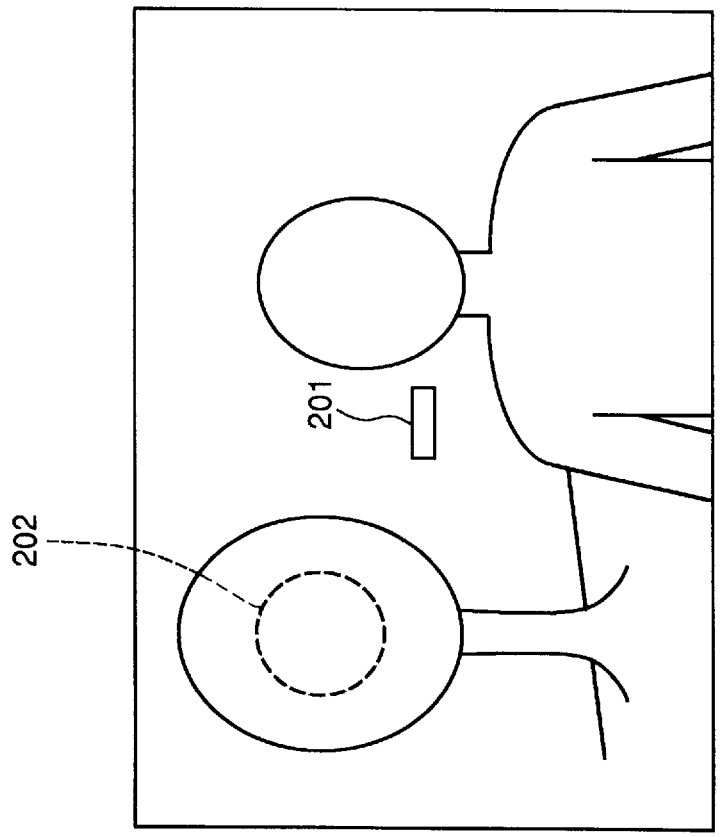
FIGS. 2A to 2C are explanatory views of area designation according to the first embodiment.

Preferred embodiments of the present invention will be described in detail in accordance with the accompanying drawings.

First Embodiment

FIG. 1 shows the construction of a camera as the embodiment of the present invention.

In FIG. 1, reference numeral 1 denotes a zoom sensing optical system, having a zooming function, for forming an optical image of an object on an image sensing device 2; 2, a solid-state image sensing device (CCD) for converting the formed optical image of the object into an electric signal; 3, an A/D converter for converting the electric signal from the CCD 2 into a digital signal; 4, image sensing signal processor for converting the output from the A/D converter 3 into a video signal; 5, a memory for storing the video signal; 6, a motion detecting unit for detecting motion from the video signal; 7, a system controller for controlling the overall system; 8, a compression/expansion circuit for compressing or expanding the video signal; and 9, a recording unit for recording the video signal.

Numeral 10 denotes a pictorial circuit for generating a cursor signal to be super-imposed and the like; 11, a window cut-out circuit for partially extracting a signal from the video signal; 12, an AE integration circuit for calculating the average value of a luminance signal; 13, a WB integration circuit for calculating the average value of a color difference signal; 14, a focus detecting circuit for detecting the peak of frequency characteristic of the luminance signal; 15, a focus adjusting unit for adjusting focus; and 16, a zoom driving circuit for driving zooming of the optical system 1.

Numeral 17 denotes an output signal processor for mixing a signal from the memory 5 and the cursor signal into an output signal; 18, a D/A converter for converting the signal from the output signal processor 17; 19, an electronic view finder for displaying an image based on the signal from the D/A converter 18; and 20, a video signal output terminal for outputting the signal from the D/A converter 18 to the view finder 19 and a monitor television or the like.

Numeral 21 denotes an area designation switch (hereinafter "switch" will be abbreviated to "SW") for designating an area; 22, a release SW for instructing image shooting operation; 23, a zoomed area designation SW for designating a area to be zoomed; and 24, a cursor moving switch for moving the cursor.

In the above construction, the zoom sensing optical system forms an object image on the CCD 2, which converts the object image into an electric signal, then an A/D converter 3 reads the electric signal out of the CCD 2 and converts the signal into a digital signal. The image sensing signal processor 4 converts the digital signal into a video signal, and outputs the video signal into the memory 5, the motion detecting unit 6 and the window cut-out circuit 11.

The signal from the memory 5 is outputted via the output signal processor 17 and the D/A converter 18 to the electronic view finder 19, and a user can see an image based on the signal.

Figure 2B:
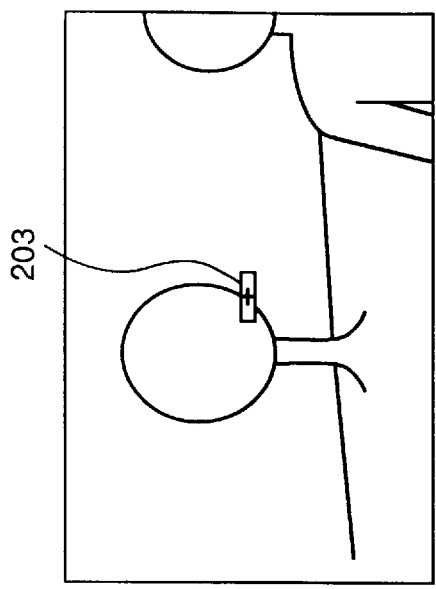
Figure 4:
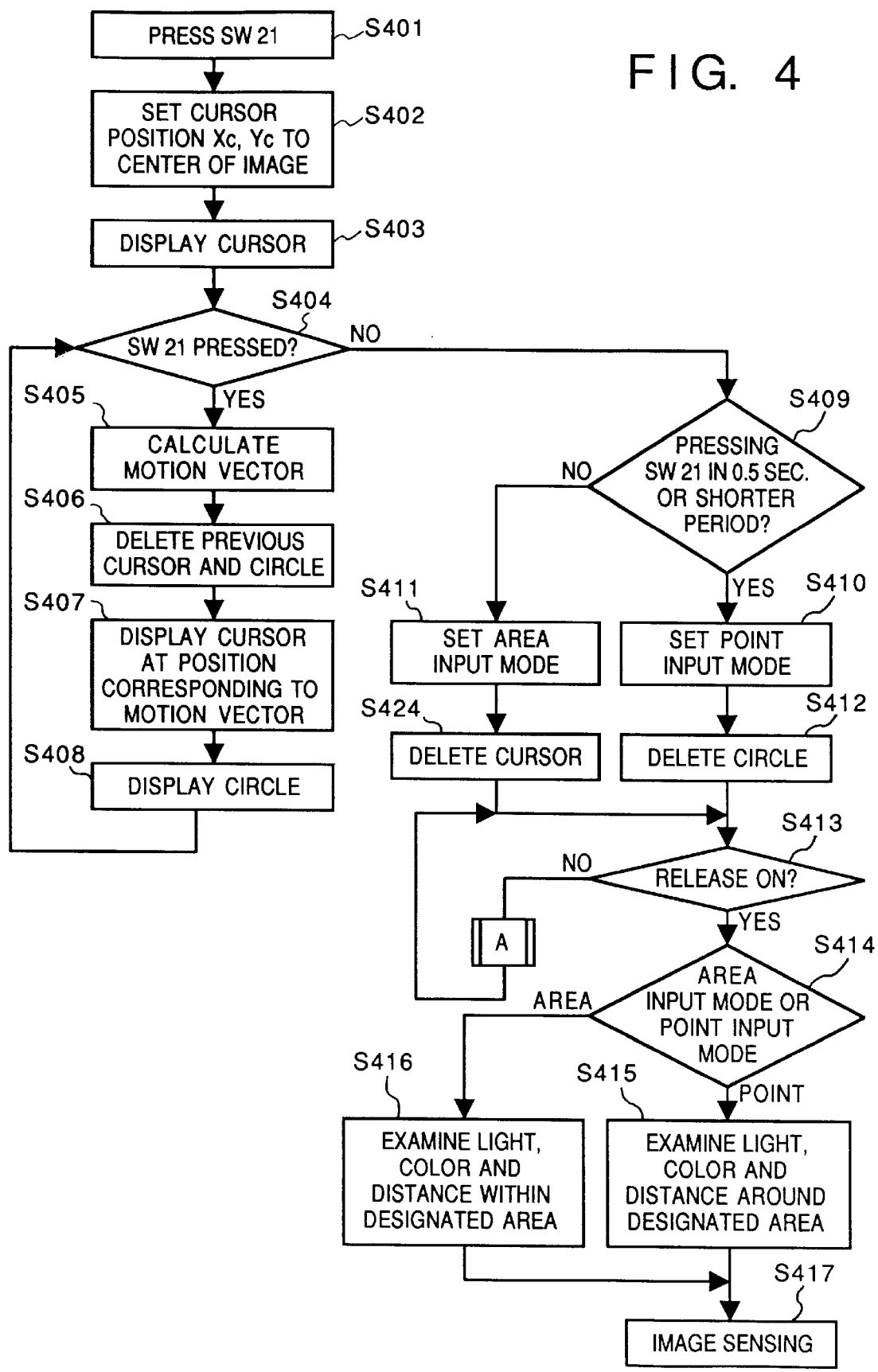
FIG. 4 is a flowchart showing the operation of the first embodiment.
Figure 5:
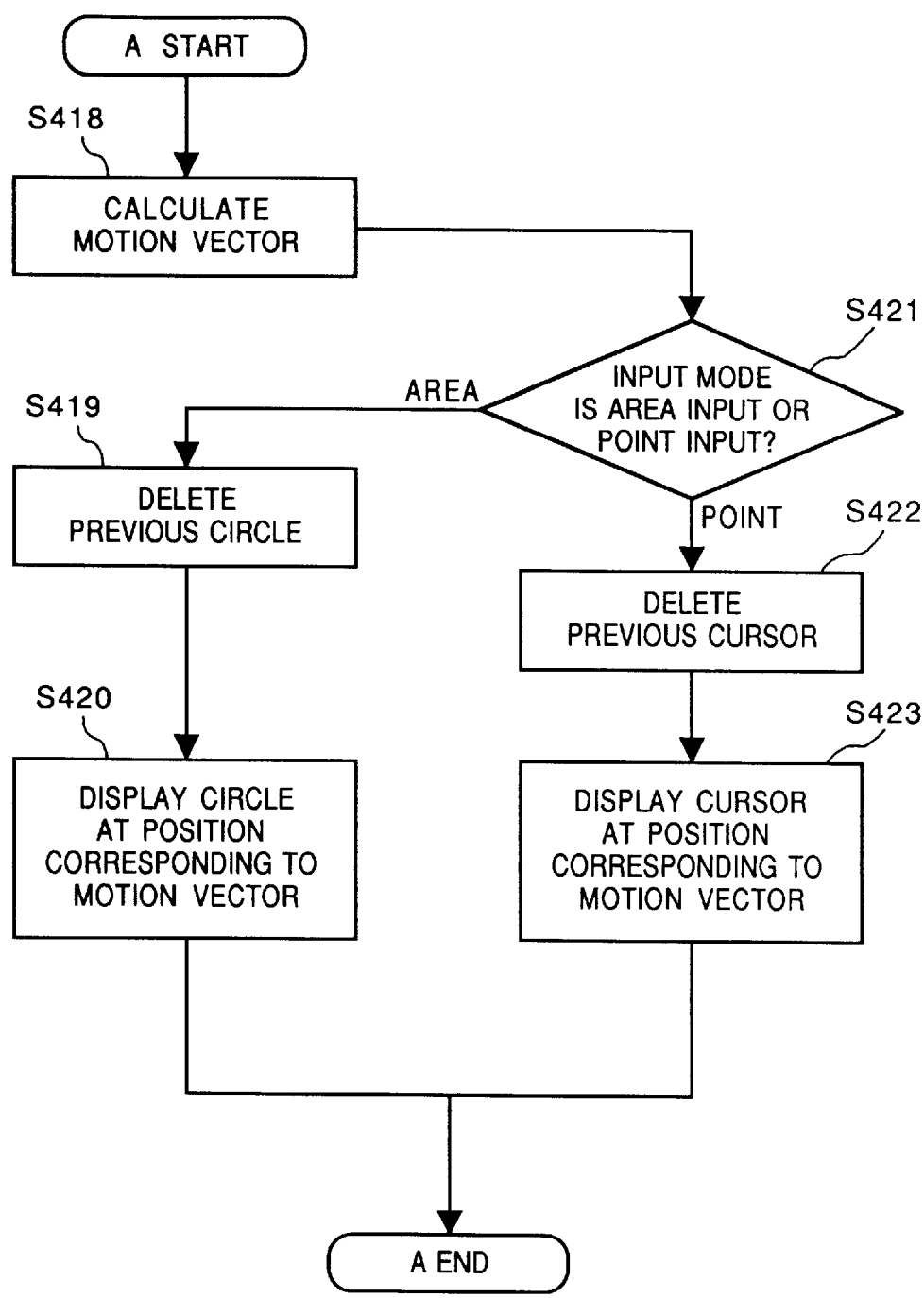
FIG. 5 is a flowchart showing the operation for moving a position of the first embodiment.

Assuming that while the user is watching an image as shown in FIG. 2A on the electronic view finder 19, the user wishes to move the focus point and an exposure point to the dash-line circle portion 202, the user pans the camera as shown in FIG. 2B, and presses the area designation SW 21 (step S401 in FIG. 4 to be described later). The system controller 7 detects that the area designation SW 21 has been turned on and controls the pictorial circuit 10 to generate a cursor signal. The output signal processor 17 receives the cursor signal and mixes the signal into the video signal, then displays a cursor 203 on the electronic view finder 19. As a result, the user can see a cursor mark "+" at the center of the finder image of the electronic view finder 19 (FIG. 2B, S403).

If the system controller detects that the area designation SW 21 has been still pressed, the motion detecting unit 6 calculates a motion vector based on the sensed video signal (S405). The motion detecting unit 6 divides the video signal into a plurality of blocks, and detects a motion vector in the respective blocks. This motion detecting unit is a device recently practiced in a small-sized video camera and the like. The principle of the dividing of video signal by the motion detecting unit 6 will be described with reference to FIGS. 3A to 3C.

FIG. 3A shows the divided display image. In FIG. 3A, reference character M denotes the number of blocks in the horizontal direction; and N, the number of blocks in the vertical direction. FIG. 3B shows pixels in one of the blocks. The central pixel has coordinates (0, 0), and the video signal value of the central pixel is X(0, 0). The value of an adjacent pixel at the right hand of the central pixel is X(1, 0), and an adjacent pixel above the central pixel is X(0, 1). On the assumption that the pixel value of a pixel of a previous frame corresponding to the central pixel is represented by Xo, the motion detecting unit 6 performs the following calculation on twenty-five pixels, the central pixel (0, 0), the peripheral eight pixels surrounding the central pixel (0, 0), and further sixteen pixels surrounding the peripheral eight pixels:

$$|X(i, j) - Xo(0, 0)|$$

$$i, j = -2 \sim 2$$

| |: an absolute value

The value of i, j, i.e., the minimum value among the value obtained from this expression becomes a motion vector in its block. Note that in this example where the motion detection is performed within two neighboring pixels of the central pixel, i, j=2~2. However, the same calculation may be performed on more neighboring pixels to detect faster motion.

This processing is performed on all the blocks to obtain motion vectors for the blocks. Next, to determine the panning amount of the camera by synthesizing all the motion vector information, motion vectors which occurred due to movement of a part of the object in the image must be eliminated. In order to obtain a motion vectors of panning a camera, a histogram of the motion vectors from the entire image M×N blocks is formed, then the average value is obtained within an area having large values as the motion vector of the panning, and the vectors of values in other area are eliminated. If a histogram as shown in FIG. 3C is formed, the panning amount of the camera is (1, 1). In this manner, the panning amount (Xm, Ym) indicating that the camera has been panned by Xm dots in the horizontal direction and Ym dots in the vertical direction is obtained.

The system controller 7 controls the pictorial circuit 10 by an amount corresponding to the panning amount, to move the cursor mark "+" (S406 and S407). In a case where the image sensing system is in accordance with the NTSC specifications, usually the number of dots in the image sensing signal processor 4 for a display image is seven hundred and sixty-eight dots in the horizontal direction and four hundred and ninety dots in the vertical direction. If the number of dots in the electronic view finder 19 is about one-hundred thousand, the number of dots in the image sensing signal processor 4 is four-hundred and seventy-three dots in the horizontal direction and two-hundred and ten dots in the vertical direction. In this case, the pixel ratio of the pixels in the image sensing system to that of the electronic view finder 19 is 2:0. As a result, when the Ym dots are obtained from the motion detection, the cursor mark in the electronic view finder 19 is moved by Ym/2 dots. As to the horizontal direction, in both image sensing system and electronic view finder, the horizontal/vertical dot ratio is not "1", further, the respective horizontal/vertical dot ratios are different. These ratios are corrected to respectively have a 1.24 horizontal/vertical dot ratio. In this example, as an appropriate ratio is "1.24", the cursor in the electronic view finder 19 is moved by 1.24×Xm dots (S407).

Figure 2C:
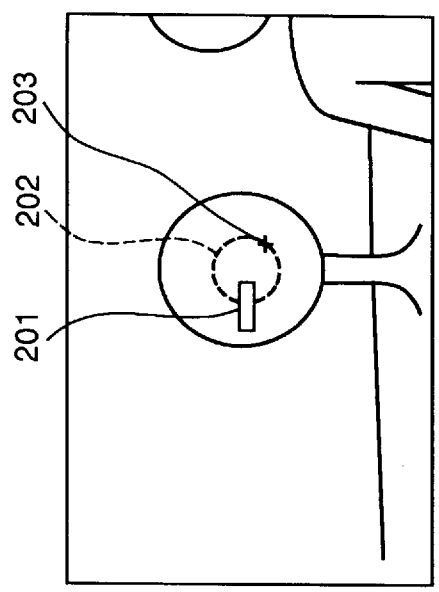

Then, the cursor mark 203 moves in the image of the electronic view finder 19 as if it is an object on an image. At this time, the system controller 7 depicts a circle 202 as shown in FIG. 2C (S 408). This processing is repeated as fast as possible (returned to S 404).

In this manner, the user slowly pans the camera while pressing the area designation SW 21, to move the cursor mark 203 to a position as shown in FIG. 2C, then designates the area 202, and releases the area designation SW 21. At this time, if the period where the area designation SW 21 has been pressed is 0.5 seconds or longer (S409), it is determined that the user has made area designation, and an area designation mode is set as an input mode (S411).

Thereafter, whether or not the release SW 22 has been pressed is checked (S413). If it has not been pressed, again the motion vector detection is made (S418). After it is judged that the mode is the area designation mode (S421), the circle 202 is deleted (S419), and based on the result from the motion detection, the circle 202 is re-depicted for an amount corresponding to (S420). In this manner, the user again pans the camera until the finder image becomes as shown in FIG. 2A. In the image as shown in FIG. 2A, a dashlined circle 202 appears at the area.

The user presses the release SW 22 (S413). then the system controller 7 judges that the input mode has been the area designation mode (S414), and measures the light, color and focal length within the area 202 (S416).

The system controller 7 sets the coordinate value of the area 202 at the window cut-out circuit 11. the window cut-out circuit 11 outputs only the video signal in the area to the AE integration circuit 12, the WB integration circuit 13 and the focus detecting circuit 14. The AE integration circuit 12 integrates the received video signal value and outputs the integrated result to the system controller 7. The system controller 7 controls the iris open and the shutter speed of the camera so that the received value becomes the proper exposure value. Similarly, the WB integration circuit 13 performs integration of a color-difference signal in the cut-out area, and based on the integration result, the system controller 7 controls the image sensing signal processor 4 so that the image of appropriate white balance can be obtained. Further, the focus detecting circuit 14 outputs focus information based on the cut-out video signal to the system controller 7, and the system controller 7 drives the focus adjusting unit 15 to perform focusing operation.

After the system controller 7 have made the above settings for proper exposure, proper white balance and proper focus (f-stop), the controller 7 performs image sensing (S417). This may be performed in any of moving image recording and still-image recording. In case of moving image recording, a video signal is continuously read out of the CCD 2, signal processing is continuously performed, then in accordance with necessity, the data amount is changed by the compression/expansion circuit 8, and the recording is performed by the recording unit 9.

In case of still-image recording, only an image for one frame is projected on the CCD 2 using a shutter function, and a signal read out of the CCD 2 may be compressed in accordance with necessity. Otherwise, similar to the moving image recording, a signal is continuously read out of the CCD 2, and only one frame may be recorded. These techniques are well known in electronic still-camera and movie cameras and not relate to the nature of the present invention, therefore, detailed explanations of these techniques will be omitted.

Further, in accordance with the present embodiment, an arbitrary point in the finder image of the electronic view finder 19 can be designated as in the following example.

Figure 6B:
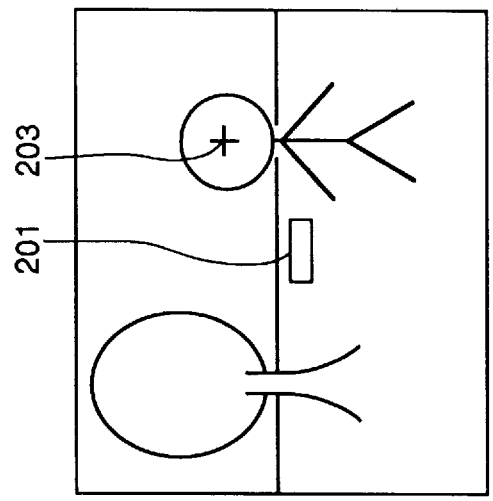
FIGS. 6A and 6B are explanatory views of point designation according to the first embodiment.
Figure 6A:
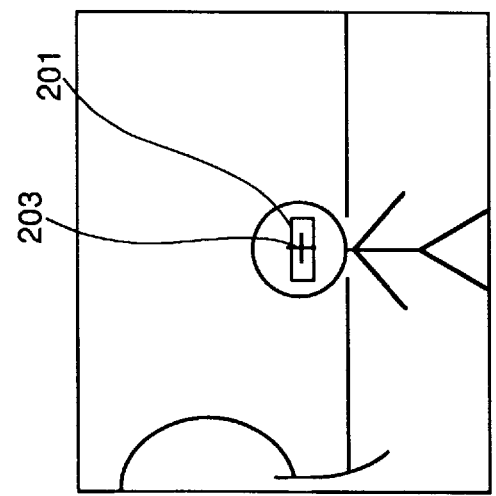

As shown in FIG. 6A, the user moves the marker 201 displayed in the finder image on the electronic view finder 19 to a point that the user considers the most desirable image sensing point and presses the area designation SW 21. Then the cursor mark "+" 203 is displayed. The user then releases the area designation SW 21. The system controller 7 detects that the input mode is a point input mode ("YES" in S409). Thereafter, the user slowly pans the camera until the finder image becomes as shown in FIG. 6B to determine the composition. At this time, a dash-line circle does not appear since the user does not presses the area designation SW 21, and only the cursor 203 moves (S418, S421, S422 and S423). As the user presses the release SW 22 (S413), the system controller 7 performs measurement of light, color and focal length around the cursor position (S415) and allows image sensing (S417).

Second Embodiment

Next, a second embodiment using the area designation for automatic zooming will be described below.

Figure 7C:
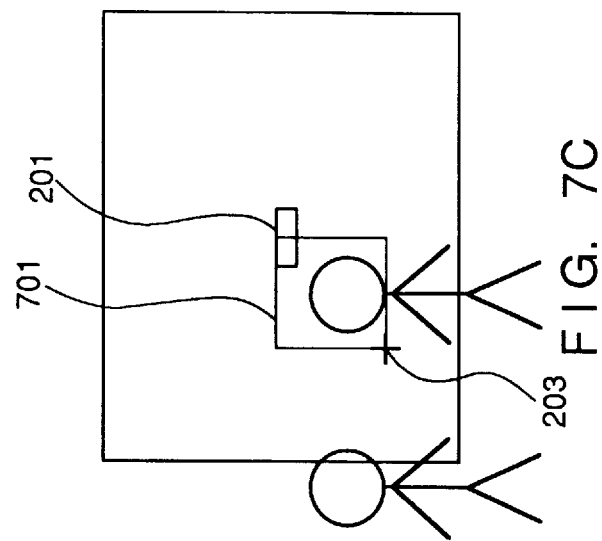
FIGS. 7A to 7D are explanatory views of point designation with zooming according to a second embodiment of the present invention.
Figure 7D:
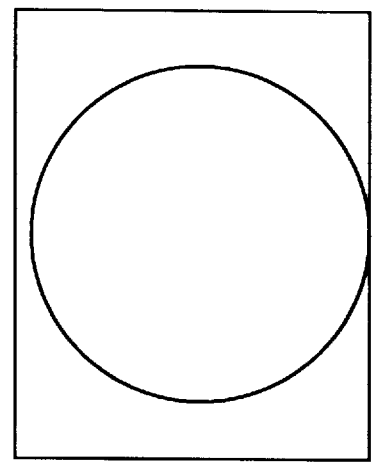
Figure 7B:
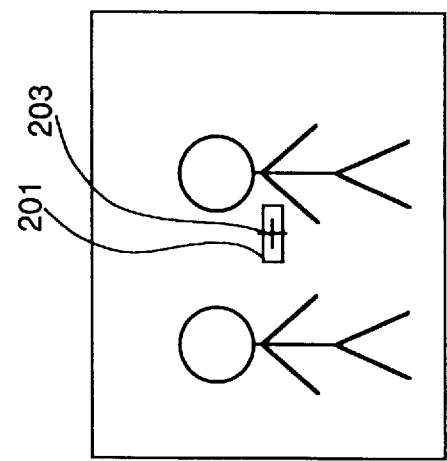
Figure 7A:
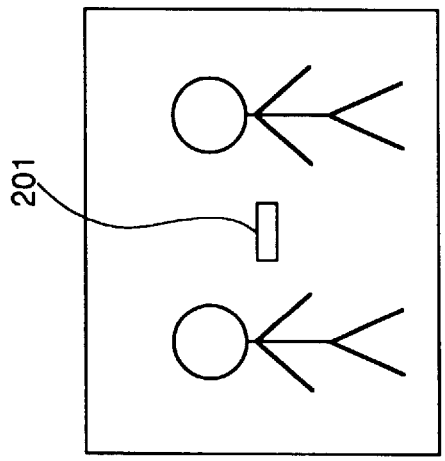

In FIG. 7A, assuming that the user desires to zoom only the head of the person at the right hand, the user pans the camera until the finder image becomes as shown in FIG. 7B and presses the zoomed area designation SW 23. Then, in accordance with processing similar to that in the flowchart in FIG. 4, the cursor 203 is displayed. The user pans the camera while pressing the zoomed area designation SW 23 until the finder image becomes as shown in FIG. 7C. Then, a rectangular (marker) formed by the central marker 201 and the cursor 203 as opposite angle corners is displayed. When the user releases the zoomed area designation SW 23, the system controller 7 controls the zoom driving circuit 16 so that the rectangle matches to the image frame as shown in FIG. 7C.

Third Embodiment

A third embodiment using the point designation of the second embodiment for manipulation of camera will be described below.

Figure 9:
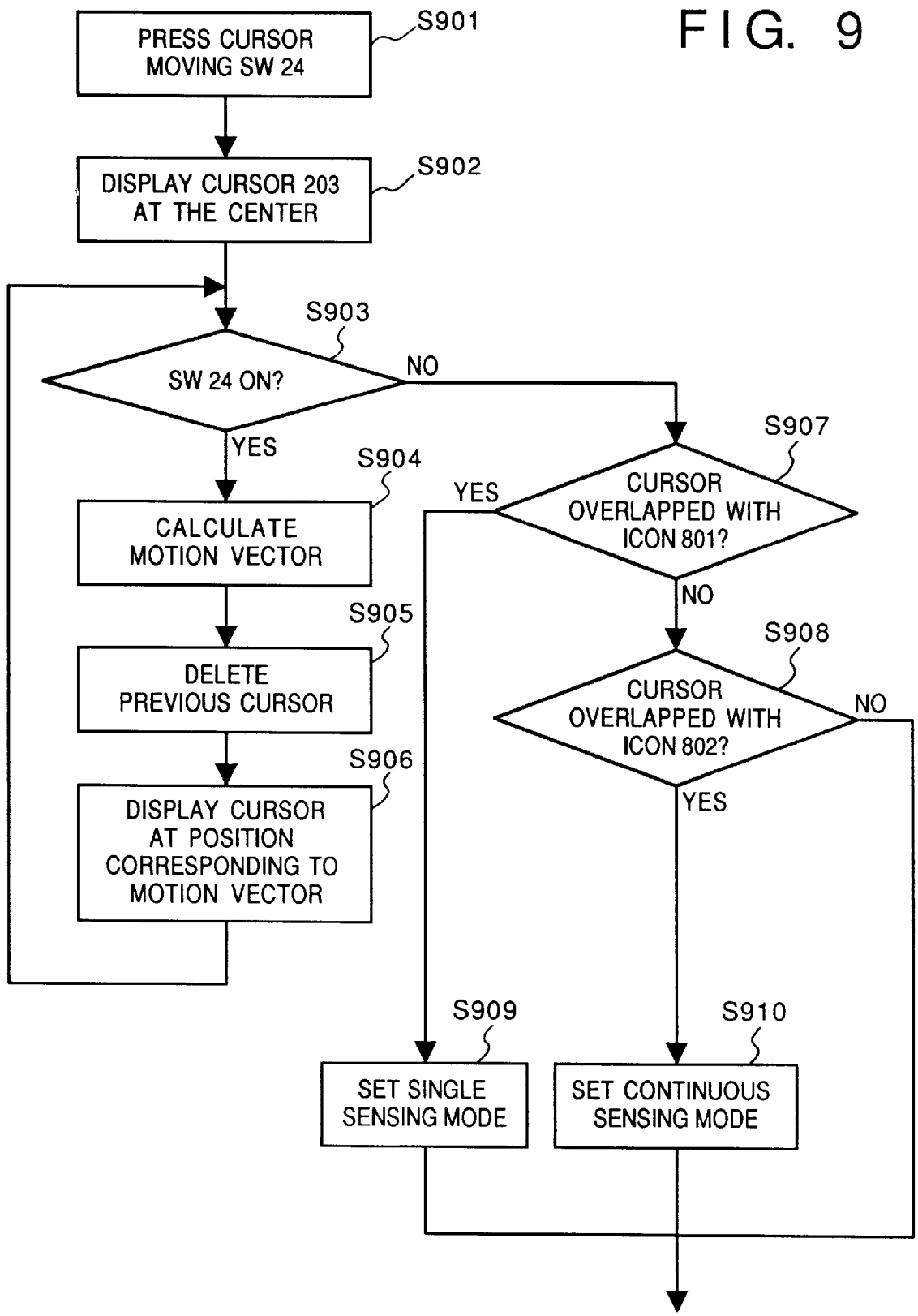
FIG. 9 is a flowchart showing the operation of the third embodiment.
Figure 10:
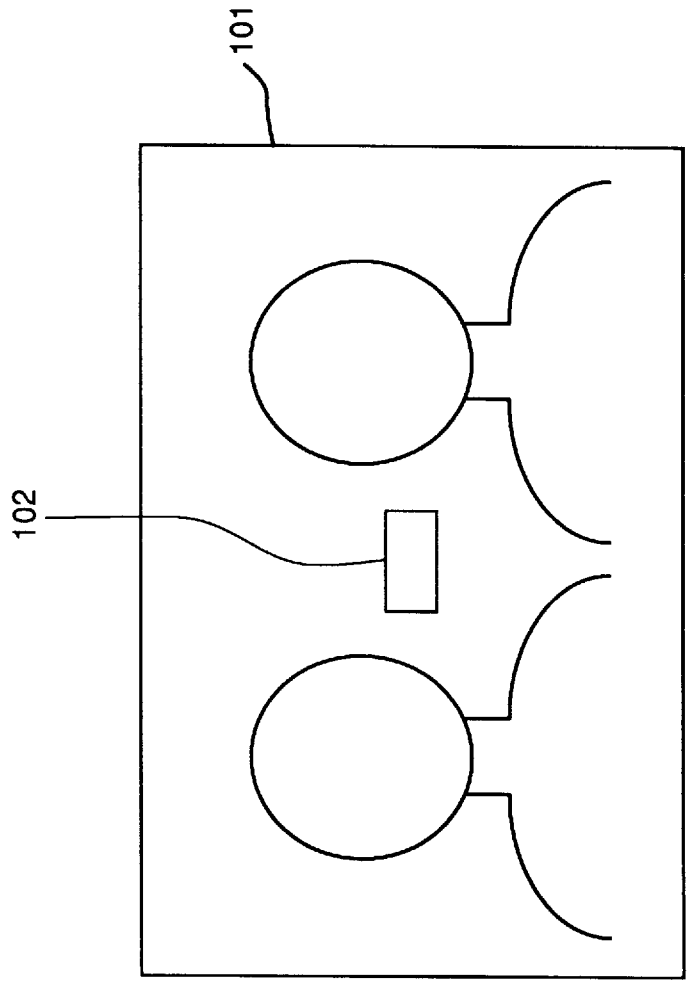
FIG. 10 is an explanatory view of a conventional point designation.
Figure 11:
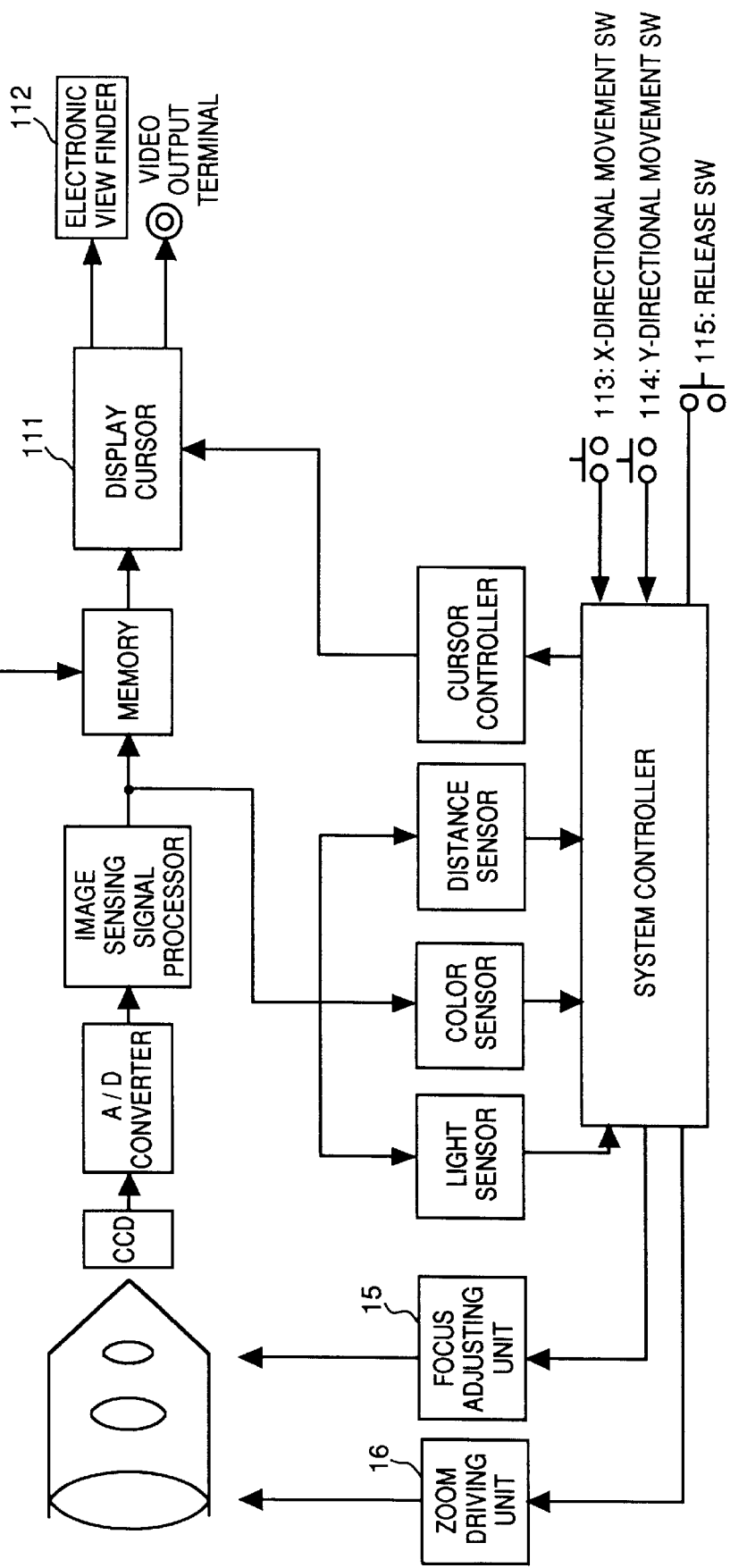
FIG. 11 is a block diagram showing the construction of a conventional camera.
Figure 12:
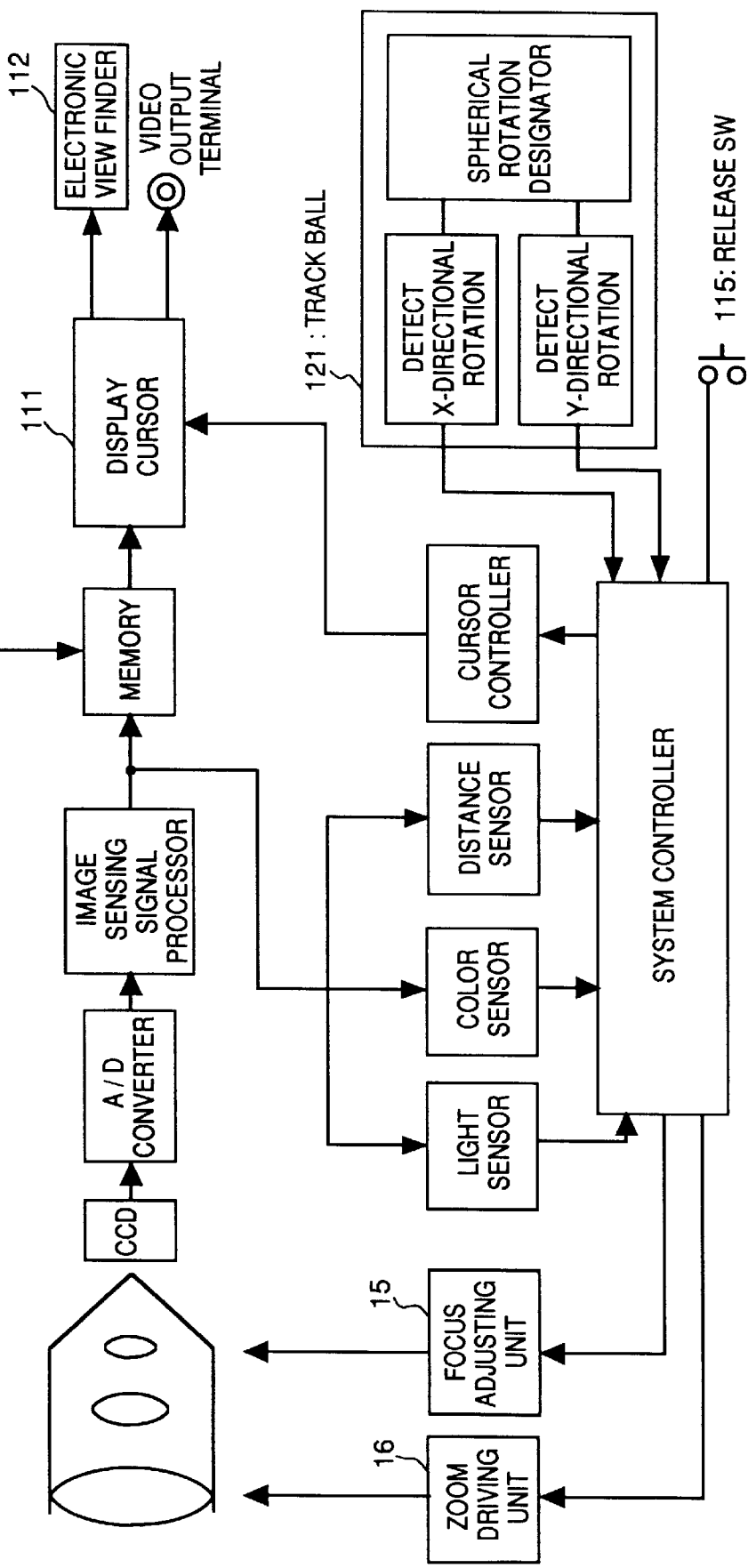
FIG. 12 is a block diagram showing the construction of another conventional camera.
Figure 13:
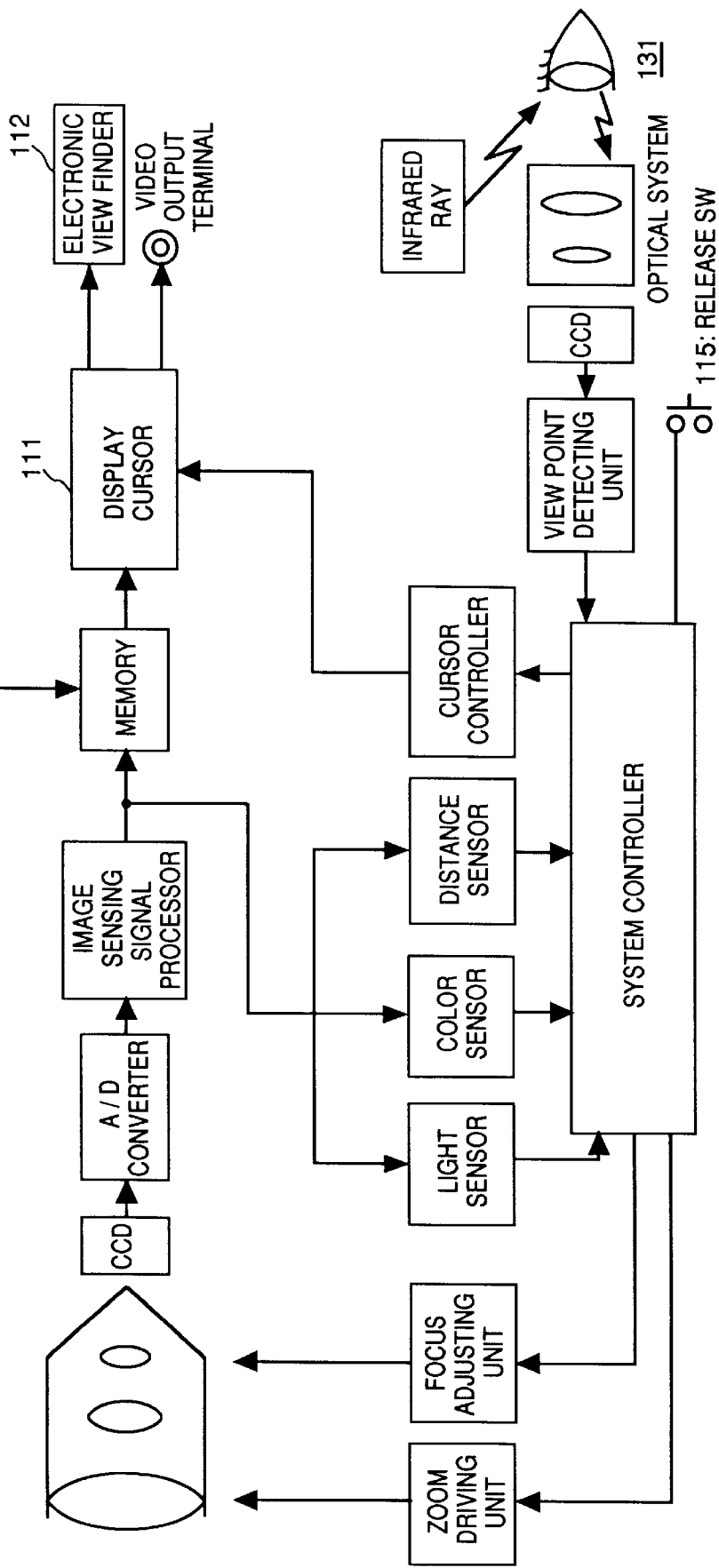
FIG. 13 is a block diagram showing the construction of further another conventional camera.

FIGS. 8A to 8C show images displayed on the electronic view finder 19. In the images, icons "SING" 801 and "CONT" 802 are displayed under the control of the pictorial circuit 10. "SING" means single image shooting, and "CONT", continuous shooting. In this state, the user presses the cursor moving SW 24 (S901 in FIG. 9) with anything as an object (note that for the purpose of easy motion detection, image sensing of a wall surface, sky etc. should be avoided). Then, the system controller 7 controls the pictorial circuit 10 to display the cursor 203 at the center of the finder image of the electronic view finder 19 (S902, FIG. 8B).

Next, the user slowly pans the camera while pressing the cursor moving SW 24. At this time, the system controller 7 receives a motion vector amount from the motion detecting unit 6 (S904), controls the pictorial circuit 10 to delete the previous cursor (S905) and again display the cursor 203 corresponding to the motion vector (S906).

After the camera has been panned and the cursor 203 has been overlapped with the icon 801, the user releases the cursor moving SW 24. Then the system controller 7 detects that the cursor 203 is overlapped with the icon 801 (S907), and sets the image sensing mode to a single sensing mode (one image sensing by pressing the release SW once) (S909). Also, setting of a continuous sensing mode (sensing for plural images while pressing the release SW) can be made.

Modifications

Icons other than those in FIGS. 8A to 8C may be used. Various operations may be instructed by using icons other than that in FIG. 8 the combinations of icons and operation buttons. As a point designating device, a mouse and a tablet (digitizer) used for computers, a touch-panel and the like can be used.

In the first to second embodiments, an area or a point in a finder image is designated for measuring light, color and focal length, however, if the area/point designation is made for the purpose of designating an area/point as shown in the third embodiment, the area/point designation of the present invention can be applied to other examples.

As described above, an area or point in a finder image can be designated without using any specific operation device, thus excellent operation environment can be provided to the user.

Recently, a vibration-proof system on image sensing devices such as a small-sized video camera, includes a motion detecting device and blur correction based on the detected motion information, is available. The motion detecting unit of the present invention may be used in such vibration-proof system. If a camera has this vibration-proof system, the present invention can be applied to the camera without increasing manufacturing costs.

As many apparently widely different embodiments of the present invention can be made without departing from the spirit and scope thereof, it is to be understood that the invention is not limited to the specific embodiments thereof except as defined in the appended claims.

What is claimed is:

1. A camera apparatus comprising:

image input means;

display means for displaying a fixed indication corresponding to a predetermined camera control function on an image input by said image input means;

motion detection means for detecting motion of said camera apparatus based on an output from said image input means;

generation means for generating a cursor on the image input by said image input means;

cursor shift means for shifting a position of said cursor generated by said generation means based on an output from said motion detection means; and designation means for allowing execution of the predetermined camera control function corresponding to said fixed indication by operating a predetermined operation member when said cursor overlaps with said fixed indication on the image input by said image input means.

2. The apparatus according to claim 1, wherein said operation member includes a manual switch.

3. A position designating method for designating a fixed area on a display device, comprising the steps of:

displaying a cursor for designating said fixed area on an image;

moving said cursor according to a movement of said display device;

judging whether a position of said cursor overlaps on said fixed area; and operating an operation member so that a predetermined camera control function, in respect to said fixed area, can be executed.

4. The method according to claim 1, wherein a plurality of said fixed areas are on a display of said display device.

5. The method according to claim 1, wherein said fixed area is used to execute the predetermined function.

6. An image area designating apparatus comprising:

image input means;

displaying means for displaying an image input by said image input means;

creating means for creating a desired image area on said display means based on a locus of motion relatively between an object image and the image area designating apparatus;

motion detection means for detecting motion of the object image;

moving means for moving the desired image area created by said creating means in response to the motion of the object image detected by said motion detection means; and designation means for allowing execution of a predetermined function based on image signals within the desired image area moved by said moving means.

7. The apparatus according to claim 6, wherein said position designating apparatus is a camera apparatus.

8. A method for designating an image area comprising:

receiving an input image;

creating a desired image area on a display based on a locus of motion relatively between an object image and a position designating apparatus;

detecting motion of the object image;

moving the desired image area in response to the detected motion of the object image; and allowing execution of a predetermined function based on image signals within the desired image area.

9. The method according to claim 8, wherein said position designating apparatus is a camera apparatus.

* * * * *

UNITED STATES PATENT AND TRADEMARK OFFICE
CERTIFICATE OF CORRECTION

PATENT NO. : 5,808,678
DATED : September 15, 1998
INVENTOR(S) : Yuji Sakaegi

It is certified that error appears in the above-identified patent and that said Letters Patent is hereby corrected as shown below:

ON the title page, item [54] and col. 1, line 2,

In the Title:

Delete "Designing" and insert therefore -- Designating --.

Column 1, line 2 of the title, delete "Designing" and insert therefore -- Designating --.

In the Claims:

Claim 4, Col. 8, line 29, delete "Claim 1" and insert therefor -- Claim 3 --.

Claim 5, Col. 8, line 31, delete "Claim 1" and insert therefor -- Claim 3 --

Claim 9, Col. 8, line 64, delete "Claim 8" and insert therefor -- Claim 6 --

Signed and Sealed this

Twenty-sixth Day of January, 1999

Attest:

Attesting Officer

*Acting Commissioner of Patents and Trademarks*